(12) United States Patent
Düser et al.

(10) Patent No.: US 10,161,832 B2
(45) Date of Patent: Dec. 25, 2018

(54) METHOD FOR SIMULATING CORNERING

(71) Applicant: AVL LIST GMBH, Graz (AT)

(72) Inventors: Tobias Düser, Bensheim (DE); Rolf Hettel, Karlsruhe (DE)

(73) Assignee: AVL LIST GMBH, Graz (AT)

( * ) Notice: Subject to any disclaimer, the term of this patent is extended or adjusted under 35 U.S.C. 154(b) by 171 days.

(21) Appl. No.: 14/914,505

(22) PCT Filed: Aug. 29, 2014

(86) PCT No.: PCT/EP2014/068332
§ 371 (c)(1),
(2) Date: Feb. 25, 2016

(87) PCT Pub. No.: WO2015/028585
PCT Pub. Date: Mar. 5, 2016

(65) Prior Publication Data
US 2016/0209297 A1    Jul. 21, 2016

(30) Foreign Application Priority Data

Aug. 29, 2013  (AT) .............................. A 50532/2013

(51) Int. Cl.
*G01M 17/06* (2006.01)
*G01M 17/007* (2006.01)

(52) U.S. Cl.
CPC ...... *G01M 17/065* (2013.01); *G01M 17/0072* (2013.01)

(58) Field of Classification Search
CPC ......... G01M 17/0072; G01M 17/0074; G01M 17/06; G01M 17/065
See application file for complete search history.

(56) References Cited

U.S. PATENT DOCUMENTS

| | | | |
|---|---|---|---|
| 4,186,593 A | 2/1980 | Watanabe | |
| 5,101,660 A * | 4/1992 | La Belle | G01M 17/0072 73/116.06 |
| 5,323,644 A * | 6/1994 | Schaefer | G01M 17/06 73/116.06 |
| 5,375,460 A | 12/1994 | La Belle | |
| 5,531,107 A * | 7/1996 | Ganzhorn, Jr. | G01L 3/22 73/116.06 |

(Continued)

FOREIGN PATENT DOCUMENTS

| | | |
|---|---|---|
| DE | 102010049689 | 5/2011 |
| JP | H034135 A | 1/1991 |

(Continued)

OTHER PUBLICATIONS

English Abstract of JP 2012149925.
(Continued)

*Primary Examiner* — Freddie Kirkland, III
(74) *Attorney, Agent, or Firm* — Dykema Gossett PLLC

(57) ABSTRACT

A method for simulating cornering of a vehicle 2 being tested on a roller dynamometer 1 to determine a measured variable 13, wherein the vehicle 2 being tested on the roller dynamometer 1 is operated as though driving straight ahead, and to simulate cornering the additional resistance forces of cornering are taken into account in the form of a correction parameter 9.

18 Claims, 1 Drawing Sheet

(56) References Cited

U.S. PATENT DOCUMENTS

| | | | | |
|---|---|---|---|---|
| 6,257,056 | B1* | 7/2001 | Shibayama | G01M 17/065 73/129 |
| 6,427,528 | B1* | 8/2002 | Yamakado | G01M 17/0072 73/121 |
| 8,001,835 | B2* | 8/2011 | Engstrom | G01L 3/20 73/116.05 |
| 8,689,618 | B2* | 4/2014 | Engstrom | G01M 17/0074 73/114.13 |
| 9,157,833 | B2* | 10/2015 | Narumi | G01M 17/0074 |
| 2009/0126510 | A1* | 5/2009 | Engstrom | G01M 17/0072 73/862.14 |
| 2009/0319200 | A1 | 12/2009 | Satonaka et al. | |
| 2011/0303000 | A1* | 12/2011 | Engstrom | G01M 17/0074 73/116.06 |
| 2013/0060500 | A1 | 3/2013 | Narumi | |

FOREIGN PATENT DOCUMENTS

| | | |
|---|---|---|
| JP | H06258193 A | 9/1994 |
| JP | 2007093222 A | 4/2007 |
| JP | 2012149925 | 8/2012 |

OTHER PUBLICATIONS

T. Düser et al., "Rollenprüfstände Für Fahrzeug-Und Antriebskonzepte Von Morgen," Entwicklung Mess-Und Prüftechnik, Apr. 1, 2012, pp. 313-337.

C. Beidl et al., "Realer Kraftstoffverbrauch Undmanöverbasiertes Testen," ATZ-Automobiltechnische Zeitschrift, Apr. 1, 2013, pp. 290-295.

\* cited by examiner

METHOD FOR SIMULATING CORNERING

The invention relates to a method for simulating cornering of a vehicle which is being tested on a roller dynamometer to determine a measured variable.

In many types of tests performed on a vehicle roller dynamometer, it is crucial to simulate the longitudinal vehicle dynamics as realistically as possible. This includes the correct response behavior when the vehicle accelerates, the acceleration profile, resistances and vibration characteristics at constant operating points, and coast down and/or resistance characteristics during deceleration. The coast down and acceleration characteristics strongly influence, by way of example, the consumption of fuel measured on the dynamometer, and the associated emissions. As specified by the SAE J2264 (SAE International: Chassis Dynamometer Simulation of Road Loads Using Coastdown Techniques, Recommended Practice, 1995), for example, the coast down characteristics are made to imitate coast down behavior measured on the road.

It is of great importance in this case that the environmental influences which change when moving from the street to the dynamometer are appropriately taken into account and simulated. Depending on the testing objective, certain influences are more important than others, and must therefore be more precisely taken into consideration.

One approach which makes it possible for testing of a vehicle on a roller dynamometer to better approximate realistic conditions is shown in US 2013/0060500 A1, for example. In this case, changes in the air temperature and air pressure are particularly taken into account as possible influencing factors of the environment. The document states that the driving resistance for a vehicle is reduced as a result of the lower air pressure at higher altitudes. In this context, the resistance, which the roller opposes to the wheels of the vehicle being tested, is adjusted according to the named factors in order to make it possible to subject the test vehicle to a driving resistance, in the test simulation on a roller dynamometer, which matches reality as closely as possible.

However, an essential aspect which remains unconsidered is the dynamic effects such as those which occur during cornering, for example, and their influence on rolling resistance and the associated consumption of fuel.

Resistance forces which accordingly increase driving resistance are the result of, by way of example, potential lateral slippage on the tires, losses in the differential, and losses resulting from other auxiliary components driven during cornering such as power steering units or the like, for example.

Because steering is not practical on conventional roller dynamometers due to the fixed orientation of the axis of rotation of the rollers, the approach used for roller dynamometers is that of reproducing this cornering behavior by setting rotation speeds individually for the left and right wheels. The axis of rotation of the wheel in this case remains constantly parallel to that of the roller. However, by way of example for four-wheeled vehicles, a roller dynamometer is used which has four individually driven rollers, which is typically called a 4×4 roller dynamometer. Normally, an accordingly complex simulation model is used in the controlling of the individual rollers.

The use of four individually-driven rollers is particularly necessary if the testing objective depends on the different wheel rotation speeds, which is the case, for example, when taking measurements of the differential, analyzing and optimizing ABS and ESC, as well as in modern drive concepts with torque vectoring.

In most cases, other testing objectives are the priority, such as fuel consumption, exhaust certification, or performance characteristics. However, because these measurements are dependent on the central drive train rotation speed and torque rather than the individual wheel rotation speeds and wheel torques, the characteristics can be tested without individual wheel control. For such applications, a conventional roller dynamometer, called a 4×2 roller dynamometer, is adequate, wherein both front wheels, and both rear wheels, are positioned on common rollers, respectively; or a further-simplified version, called a 2×1 roller dynamometer may be adequate, wherein only one roller is functionally assigned to the drive wheels. Because the technical and therefore financial outlays for the installation are significantly lower for such roller dynamometers which are simplified compared to a 4×4 roller dynamometer, in most cases only these 4×2 and/or 2×1 roller dynamometers are available.

It is disadvantageous in this connection, that it is not possible to take into account the above-mentioned effects arising during cornering, due to the fact that the inner and outer wheels in the curve are positioned on the same roller.

The problem addressed by the present invention is that of enabling the incorporation of additional resistances which arise during cornering into the evaluation of a vehicle being tested on a roller dynamometer, without necessarily requiring a roller dynamometer which allows regulating the rotation speed of individual wheels.

This object is solved according to the invention in that the vehicle being tested is operated on the roller dynamometer as if driving straight ahead, and for simulating cornering the additional resistance forces are incorporated in the form of a correction parameter.

This enables roller dynamometer operators using an existing 4×2 or 2×1 roller dynamometer to transmit driving resistances as they occur in reality during cornering. If used on a 4×4 roller dynamometer, it is not necessary to use the conventionally necessary, complex simulation model, thereby significantly reducing the complexity of regulation. Because the correction parameter only takes into account the resistance forces additionally applied during cornering, the proposed method is an extension and/or simplification for the methods conventionally used on roller dynamometers. The method can of course also be used for roller dynamometers which are utilized for test vehicles having more or fewer than four wheels.

In one implementation of the invention, a cumulative resistance force is used as the correction parameter. It is formed by adding the resistance forces which are additionally applied during cornering, and is incorporated on the roller dynamometer in the form of a variable resistance which the roller dynamometer exerts onto the test vehicle.

Because all of the resistance forces which are additionally applied during cornering, such as slippage on the tires, losses in the differential, and losses during cornering resulting from other driven auxiliary components, etc., are incorporated into one'single cumulative resistance force, it is simple to take into account the influences from the cornering in the evaluation of a test vehicle on the vehicle roller dynamometer by adding said cumulative resistance force to the conventional resistance force which occurs when driving straight ahead.

In another embodiment of the invention, a mathematical correction factor is used as the correction parameter, and the measurement which is taken is corrected by means of the same.

For example, if fuel consumption is the measurement to be taken, the correction parameter can refer to the increased fuel consumption when cornering. According to the type and number of simulated curves, the magnitude of a corresponding correction factor can be determined, wherein the same is applied mathematically, for example by simple addition, to the measurement during the analysis—in this case, fuel consumption.

In a further advantageous embodiment of the invention, a characteristic map which describes the correction parameter is compiled by real coast down experiments of the test vehicle when cornering in different radii.

If the correction parameter and/or the associated, descriptive characteristic map is compiled by real experiments, all resistances which occur in reality, such as the losses in the differential and others, for example, are also necessarily incorporated as well, thereby reaching an optimum approximation of reality.

In a further advantageous embodiment of the invention, the correction parameter is calculated using physical models.

This enables the incorporation of different resistances which occur during cornering, without the need to carry out the real coast down experiments mentioned above. The use of physical models in this case enables any arbitrary level of gradations of curve radii and driving speeds. In addition, depending on existing requirements, for example with respect to calculation time or number of parameters taken into account, different physical models can be used. Naturally, increasing complexity of the physical model and an increasing number of parameters being incorporated, lead to a better approximation of reality.

In a further embodiment of the invention, a physical model is used to take into account resistance forces which are created by the forces acting on the tires and the chassis of the test vehicle.

In an analogous manner, in further advantageous embodiments of the invention, a physical model is used to take into account resistance forces which are created by losses in the drive train of the test vehicle, and/or resistance forces which are created by auxiliary units of the test vehicle which are dependent on the steering.

The separate incorporation of different sources for possible resistance forces makes it possible to adapt the physical model to requirements.

The present invention is explained below with reference to FIGS. 1 to 3 which show, by way of example, schematic, advantageous embodiments of the invention which do not restrict the same, wherein.

Figure 1:
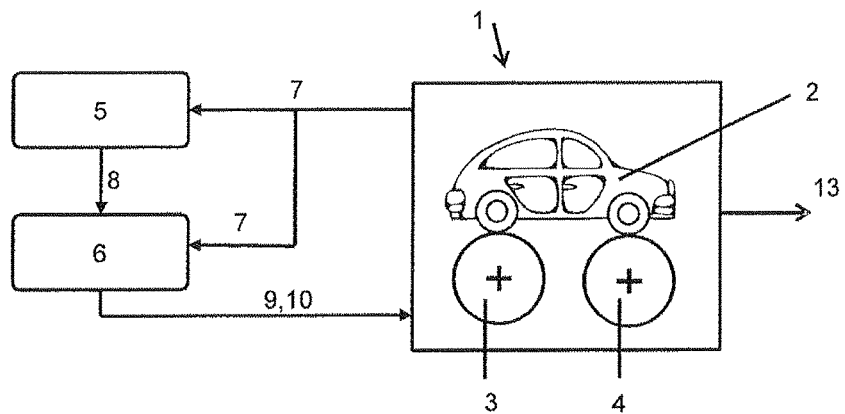
FIG. 1 shows a test vehicle on a roller dynamometer.

FIG. 1 shows a typical arrangement of a test vehicle 2 on a roller dynamometer 1, wherein the test vehicle 2 has four wheels, by way of example. A 4×2 roller dynamometer 1 is illustrated by way of example, wherein the four wheels of the test vehicle 2 are functionally assigned to two rollers which are independent of each other. In this case, the two front wheels of the test vehicle 2 are on the same roller 4 (in such cases, there could also of course be two rollers on the same axis), and both rear wheels of the test vehicle 2 are on the same roller 3. The use of a roller dynamometer 1 which is designed as a 2×1 roller dynamometer, wherein only one roller 3 is functionally assigned to—typically—the drive wheels of the test vehicle 2, can also be contemplated. The same is true for the use of a 4×4 roller dynamometer in which a separate roller is assigned to each wheel of a four-wheeled test vehicle 2. As mentioned above, the method is not restricted to the use on roller dynamometers for four-wheeled test vehicles 2.

The test vehicle 2 is operated on the roller dynamometer 1 driving straight ahead. Driving straight ahead means that all wheels of the test vehicle 2 have the same rotation speed, as can be assumed for normal straight-ahead driving at optimum wheel grip.

As can be seen in FIG. 1, the roller dynamometer 1 is connected to an environmental model 5 and an additional resistance model 6.

The environmental model 5 contains the information on the simulated route for the test vehicle 2 to travel during the testing thereof, including curves (no further information shall be provided here regarding additional route data which the model processes, such as inclinations, for example).

The environmental model 5 receives the current speed 7 measured at the wheels of the test vehicle 2 from the roller dynamometer 2, and this is converted into the distance traveled. The point in the simulated route at which the test vehicle 2 is currently found can be determined utilizing the distance traveled. When the vehicle travels through a curve, the current curve radius 8 is passed on to the resistance model 6.

In the resistance model 6 are determined the resistance forces which occur additionally during cornering and which the test vehicle 2 would have been subjected to in the current route segment specified by the environmental model 5. These additionally occurring resistance forces are collected into one value and subsequently transmitted to the roller dynamometer 1 in the form of a correction parameter 9.

In the diagram illustrated in FIG. 1, the correction parameter 9 is a cumulative resistance force 10 which is found by adding the resistance forces. Because the cumulative resistance force 10 is naturally dependent on speed, the current speed 7 is also passed on to the resistance model 6. The cumulative resistance force 10 is transmitted to the roller dynamometer 1 in the form of a correction parameter 9.

If the correction parameter 9 is the cumulative resistance force 10, in a subsequent step the resistance which the rollers 3 and 4 of the roller dynamometer oppose to the test vehicle 2 is adapted according to the curve the vehicle is traveling through.

The resistance model 6 does not contain the resistance forces which are active during driving straight ahead. Because the correction parameter 9 only incorporates the cumulative resistance force 10, which in turn only collects the resistance forces which occur additionally during cornering, the present method constitutes an extension or also a simplification for the methods conventionally used for roller dynamometers.

Such an extendable, conventional method contains, by way of example, the following approach:

$$F = F_0 + F_1 * v + F_2 * v^n + R_w * \frac{\Delta v}{\Delta t} + R_w * g * \sin\alpha$$

where:

F is tractive force $F_0$ is the fraction of the tractive force independent of speed $F_1$ is the coefficient for the linear fraction of the tractive force dependent on speed $F_2$ is the coefficient for the non-linear fraction of the tractive force dependent on speed V is the vehicle speed n is a variable exponent $R_W$ is the vehicle reference weight $R_G$ is the base inertia of the roller dynamometer $R_W^* = R_W - R_G$ is the electrically simulated mass inertia $\Delta v / \Delta t$ is acceleration G is acceleration due to gravity $R_W^* \cdot g \cdot \sin \alpha$ is the fraction of the tractive force to overcome the incline of the road surface.

As can be seen, there is no consideration therein of resistance forces which occur additionally during cornering.

The data used in the resistance model 6 to determine the correction parameter 9 can be determined in two ways.

Figure 2:
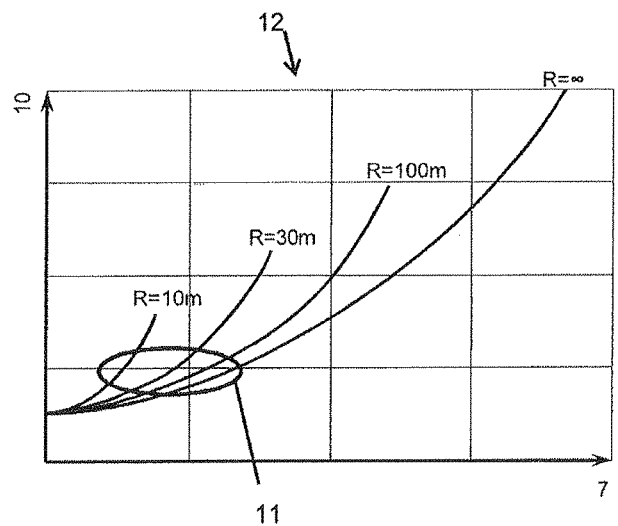
FIG. 2 shows a characteristic map for cornering resistance according to speed and curve radius.

FIG. 2 shows a characteristic map 12 used, by way of example, to determine for this purpose the cumulative resistance force 10 according to the current speed 7 and the curve radius R. This characteristic map is made of different coast down curves 11. The coast down curves 11 of the test vehicle 2 in this case are determined by real coast down experiments, for example on a testing track. The coast down experiments in this case include multiple passes in which the test vehicle 2 rolls through curves of different curve radii. The term coast down curve 5 in this case means the relationship between speed of the test vehicle 2, radius of the curve being traveled, and the resulting resistance force on the wheels of the test vehicle 2.

A further option is that of calculating the cumulative resistance force 10 using physical models.

For this purpose, by way of example, the formula for curve resistance in the linear single-track model found in "Karl Ludwig Haken, 'Grundlagen der Kraftfahrzeugtechnik,' Carl Hanser Verlag, Munich, 2008" can be used:

$$F_{cornering\ resistance} = \frac{\left(m_{Tot} * \frac{l_h}{T}\right)^2 * v^4}{R_h^2 * 2 * C_{Sh}} + \frac{\left(m_{Tot} * \frac{l_v}{T}\right)^2 * v^4}{R_h^2 * 2 * C_{Sv}}$$

where:

$m_{Tot}$ is the vehicle mass (including lift/downforce)

l is the wheelbase $l_h$, $l_v$ is the centroidal distance of the rear axis/front axis v is the vehicle speed $R_h$, $R_v$ is the curve radius at rear/front $C_{Sh}$, $C_{Sv}$ is the skew rigidity rear/front And for the vehicle mass:

$$m_{Tot} = \frac{F_m + F_a}{g} = m + \frac{F_a}{g}$$

where:

m is the vehicle mass $F_m$ is the vehicle weight force $F_a$ is the lift force wherein, for the lift force:

$$F_a = c_a * A * \rho * \frac{v^2}{2}$$

$c_a$ is the lift coefficient

A is the reference surface $\rho$ is the air density

In addition to this simple physical model, of course more complex models can be contemplated which incorporate resistance forces created by the forces which act on the tires and the chassis of the test vehicle, by losses in the drive train, and/or by auxiliary units which are dependent on the steering.

Figure 3:
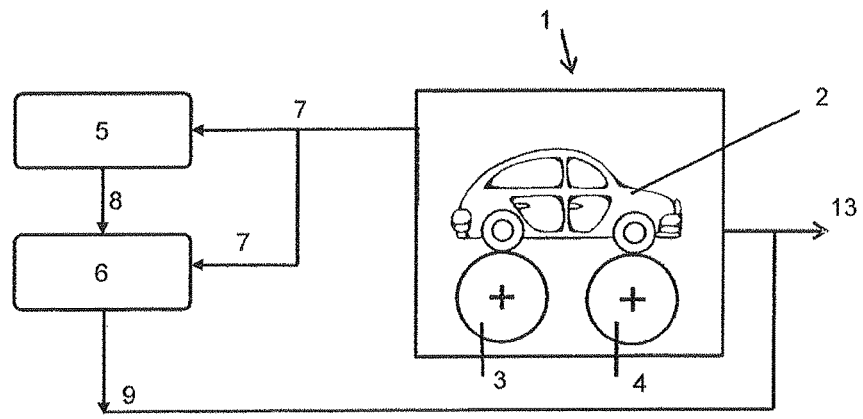
FIG. 3 shows a diagram for a direct correction of the measurement.

FIG. 3 shows a diagram wherein the correction parameter 9 is used to directly correct the measured variable 13. The correction parameter 9 need not necessarily, as noted above, be the cumulative resistance force 10. In principle, the correction parameter 9 can be directly applied to the measurement determined on the roller dynamometer 1, depending on the measurement to be taken on the roller dynamometer 1. By way of example, the fuel consumption of the test vehicle 2 could be a measured variable 13 to be measured. The characteristic map 12 described in FIG. 2 is then modified in this case such that the fuel consumption of the test vehicle 2, rather than the cumulative resistance force 10, is determined according to speed 7 and curve radius R.

If the measurement taken on the roller dynamometer 1 is analyzed, the correction parameter 9 can be directly used on the measured variable 13, and the same can consequently be corrected according to the curve which has been traveled.

The invention claimed is:

1. A method for accounting for simulated cornering of a vehicle being tested on a roller dynamometer in a measured variable:

operating the vehicle on the roller dynamometer as though the vehicle is driving straight ahead with all wheels having the same rotational speed;

determine a correction parameter by simulating cornering the vehicle on the roller dynamometer, the correction parameter associated with additional resistance forces on the vehicle due to cornering; and determine the measured variable based at least in part on the correction parameter.

2. The method according to claim 1, wherein a cumulative resistance force, associated with the simulated cornering of the vehicle, is used as the correction parameter, the cumulative resistance force is formed by adding the additional resistance forces exerted on the vehicle during cornering, said cumulative resistance force being taken into account on the roller dynamometer in the form of a modified resistance which the roller dynamometer exerts on the vehicle.

3. The method according to claim 2, wherein a characteristic map which describes the correction parameter is compiled by real coast down experiments of the vehicle being tested, in curves with different radii (R).

4. The method according to claim 2, wherein the correction parameter is calculated using one or more physical models.

5. The method according to claim 4, wherein a first physical model is used to take into account the resistance forces created by the forces acting on tires and a chassis of the vehicle being tested.

6. The method according to claim 4, wherein a second physical model is used to take into account the resistance forces created by losses in a drive train of the vehicle being tested.

7. The method according to claim 4, wherein a third physical model is used to take into account resistance forces which are created by auxiliary units of the vehicle being tested which are dependent on steering.

8. The method according to claim 1, wherein a mathematical correction factor is used as the correction parameter, wherein the measured variable is corrected by means of the correction factor.

9. The method according to claim 1, wherein the correction parameter is calculated using one or more physical models including:
- a first physical model is used to take into account resistance forces created by the forces acting on tires and a chassis of the vehicle being tested,
- a second physical model is used to take into account resistance forces created by losses in a drive train of the vehicle being tested, and
- a third physical model is used to take into account resistance forces which are created by auxiliary units of the vehicle being tested which are dependent on steering; and
wherein the resistance forces measured by the one or more physical models are added to determine the correction parameter for the simulated cornering of the vehicle.

10. The method of claim 1, wherein the additional resistance forces on the vehicle during cornering include one or more of the following: slippage on tires of the vehicle, losses in a differential of the vehicle, losses from a power steering unit, and other losses from driven auxiliary components.

11. The method of claim 1, wherein the roller dynamometer is a 4×2 or 2×1 roller dynamometer.

12. The method of claim 1, wherein the correction parameter accounts for and accumulates simulated resistance forces associated with the vehicle cornering, and an increased resistance is applied to the roller dynamometer in response to an increased correction parameter, the correction parameter includes simulated resistance forces for one or more of the following: slippage on tires of the vehicle, losses in a differential of the vehicle, losses from a power steering unit, and other losses from driven auxiliary components.

13. The method of claim 1, wherein the measured variable is one or more of the following: fuel consumption, exhaust certification, or various other performance characteristics of the vehicle.

14. The method of claim 1, wherein the correction parameter is representative of a cumulative resistive force associated with the vehicle cornering, and the method of claim 1 further includes modifying the resistance the roller dynamometer exerts on the vehicle being tested, based on the determined correction parameter, before determining the measured variable.

15. The method of claim 1, wherein the method further includes correcting the measured variable to account for the simulated cornering of the vehicle by applying the correction parameter to the measured variable to generate a corrected variable.

16. The method of claim 15, wherein the correction parameter is calculated using a characteristic map for cornering resistance based on vehicle speed and curve radius.

17. The method of claim 1, wherein the additional resistance forces on the vehicle due to cornering includes a cornering resistance measured by:

$$F_{cornering\ resistance} = \frac{\left(m_{Tot} * \frac{l_h}{l}\right)^2 * v^4}{R_h^2 * 2 * C_{Sh}} + \frac{\left(m_{Tot} * \frac{l_v}{l}\right)^2 * v^4}{R_h^2 * 2 * C_{Sv}}$$

where:
$m_{Tot}$ is the vehicle mass (including lift/downforce)
$l$ is the wheelbase
$l_h$, $l_v$ is the centroidal distance of the rear axis/front axis
$v$ is the vehicle speed
$R_h$, $R_v$ is the curve radius at rear/front
$C_{Sh}$, $C_{Sv}$ is the skew rigidity rear/front
And for the vehicle mass:

$$m_{Tot} = \frac{F_m + F_a}{g} = m + \frac{F_a}{g}$$

where:
m is the vehicle mass
$F_m$ is the vehicle weight force
$F_a$ is the lift force
wherein, for the lift force:

$$F_a = c_a * A * \rho * \frac{v^2}{2}$$

$c_a$ is the lift coefficient
A is the reference surface
$\rho$ is the air density.

18. The method of claim 1, wherein the step of determining the measured variable based at least in part on the correction parameter further includes taking the correction parameter into account on the roller dynamometer in the form of a modified resistance which the roller dynamometer exerts on the vehicle or by correcting the measured variable by means of the correction parameter.

* * * * *